(12) United States Patent
Kelly et al.

(10) Patent No.: US 9,203,624 B2
(45) Date of Patent: Dec. 1, 2015

(54) AUTHENTICATION AND NOTIFICATION HEURISTICS

(75) Inventors: Sean B. Kelly, San Francisco, CA (US); Elizabeth Caroline Furches Cranfill, San Francisco, CA (US); Thomas Alsina, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 322 days.

(21) Appl. No.: 13/488,356

(22) Filed: Jun. 4, 2012

(65) Prior Publication Data
US 2013/0326606 A1   Dec. 5, 2013

(51) Int. Cl.
| | |
|---|---|
| H04L 29/06 | (2006.01) |
| H04L 9/32 | (2006.01) |
| H04W 12/08 | (2009.01) |
| H04W 4/00 | (2009.01) |
| H04W 12/06 | (2009.01) |

(52) U.S. Cl.
CPC ............ *H04L 9/3228* (2013.01); *H04W 12/08* (2013.01); *H04L 9/3226* (2013.01); *H04W 4/001* (2013.01); *H04W 12/06* (2013.01)

(58) Field of Classification Search
CPC ....... G06F 21/00; H04L 67/32; H04L 67/325; H04L 9/3228; H04W 12/08
USPC .............................................. 709/224; 726/7
See application file for complete search history.

(56) References Cited

U.S. PATENT DOCUMENTS

| | | |
|---|---|---|
| 4,750,119 A | 6/1988 | Cohen et al. |
| 5,253,165 A | 10/1993 | Leiseca et al. |
| 5,535,383 A | 7/1996 | Gower |
| 5,627,973 A | 5/1997 | Armstrong et al. |
| 5,752,128 A | 5/1998 | Yamashita |
| 5,765,152 A | 6/1998 | Erickson |
| 5,835,911 A | 11/1998 | Nakagawa et al. |
| 5,884,280 A | 3/1999 | Yoshioka et al. |
| 6,055,513 A | 4/2000 | Katz et al. |
| 6,067,531 A | 5/2000 | Hoyt et al. |
| 6,085,253 A | 7/2000 | Blackwell et al. |
| 6,151,643 A | 11/2000 | Cheng et al. |
| 6,226,618 B1 | 5/2001 | Downs et al. |
| 6,233,682 B1 | 5/2001 | Fritsch |

(Continued)

FOREIGN PATENT DOCUMENTS

| | | |
|---|---|---|
| CN | 1809796 | 7/2006 |
| EP | 0 811 942 | 10/1997 |

(Continued)

OTHER PUBLICATIONS

"AVCataloger Overview," NC Software, Inc., http://avcataloger.com/Products.aspx, downloaded Oct. 6, 2003, pp. 1-4.

(Continued)

*Primary Examiner* — Chau Le
(74) *Attorney, Agent, or Firm* — DLA Piper LLP (US)

(57) ABSTRACT

Server-side authentication of user accounts by using multiple authentication tokens and transmission of update statement to users for updates to applications installed on their devices. Prompting users that updates are available upon determining that a threshold event has occurred and if requisite network and situational conditions exist. Batching and sending notifications or requests for authentications that are required for each application update that is currently ready for download.

23 Claims, 6 Drawing Sheets

(56) References Cited

U.S. PATENT DOCUMENTS

| | | |
|---|---|---|
| 6,256,668 B1 | 7/2001 | Slivka et al. |
| 6,263,313 B1 | 7/2001 | Milsted et al. |
| 6,275,954 B1 | 8/2001 | Herman et al. |
| 6,338,044 B1 | 1/2002 | Cook et al. |
| 6,341,353 B1 | 1/2002 | Herman et al. |
| 6,345,256 B1 | 2/2002 | Milsted |
| 6,363,486 B1 | 3/2002 | Knapton, III |
| 6,385,596 B1 | 5/2002 | Wiser et al. |
| 6,389,592 B1 | 5/2002 | Ayres et al. |
| 6,493,721 B1 | 12/2002 | Getchius et al. |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,591,420 B1 | 7/2003 | McPherson et al. |
| 6,658,476 B1 | 12/2003 | Van |
| 6,691,149 B1 | 2/2004 | Yokota et al. |
| 6,731,312 B2 | 5/2004 | Robbin |
| 6,735,572 B2 | 5/2004 | Landesmann |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,938,005 B2 | 8/2005 | Iverson et al. |
| 6,963,851 B1 | 11/2005 | Szabo et al. |
| 7,073,193 B2 | 7/2006 | Marsh |
| 7,076,445 B1 | 7/2006 | Cartwright |
| 7,096,464 B1 | 8/2006 | Weinmann |
| 7,130,807 B1 | 10/2006 | Mikurak |
| 7,168,012 B2 | 1/2007 | Clauss et al. |
| 7,209,892 B1 | 4/2007 | Galuten et al. |
| 7,275,243 B2 | 9/2007 | Gibbons et al. |
| 7,308,413 B1 | 12/2007 | Tota et al. |
| 7,330,718 B2* | 2/2008 | Liu et al. ............... 455/418 |
| 7,383,233 B1 | 6/2008 | Singh et al. |
| 7,512,622 B2 | 3/2009 | Volk |
| 7,624,046 B2 | 11/2009 | Galuten et al. |
| 7,685,512 B2 | 3/2010 | Hanson et al. |
| 7,729,946 B2 | 6/2010 | Chu |
| 7,739,256 B2 | 6/2010 | Powell |
| 7,756,920 B2 | 7/2010 | Muller et al. |
| 7,827,162 B2 | 11/2010 | Suitts et al. |
| 7,844,548 B2 | 11/2010 | Robbin et al. |
| 7,860,830 B2 | 12/2010 | Mirrashidi et al. |
| 7,962,634 B2 | 6/2011 | Cortos et al. |
| 7,987,449 B1* | 7/2011 | Marolia et al. ............. 717/120 |
| 8,015,237 B2 | 9/2011 | Muller |
| 8,219,827 B2* | 7/2012 | Nicolson et al. ............. 713/187 |
| 2001/0021926 A1 | 9/2001 | Schneck et al. |
| 2001/0037207 A1 | 11/2001 | Dejaeger |
| 2001/0044786 A1 | 11/2001 | Ishibashi |
| 2001/0054046 A1 | 12/2001 | Mikhailov et al. |
| 2002/0002541 A1 | 1/2002 | Williams |
| 2002/0032658 A1 | 3/2002 | Oki et al. |
| 2002/0047899 A1 | 4/2002 | Son et al. |
| 2002/0049844 A1 | 4/2002 | Nishikawa |
| 2002/0073177 A1 | 6/2002 | Clark et al. |
| 2002/0077986 A1 | 6/2002 | Kobata et al. |
| 2002/0078211 A1 | 6/2002 | Natarajan et al. |
| 2002/0082857 A1 | 6/2002 | Skordin et al. |
| 2002/0087440 A1 | 7/2002 | Blair et al. |
| 2002/0090934 A1 | 7/2002 | Mitchelmore |
| 2002/0091584 A1 | 7/2002 | Clark et al. |
| 2002/0099661 A1 | 7/2002 | Kii et al. |
| 2002/0099696 A1 | 7/2002 | Prince |
| 2002/0099801 A1 | 7/2002 | Ishii |
| 2002/0107803 A1 | 8/2002 | Lisanke et al. |
| 2002/0112171 A1 | 8/2002 | Ginter et al. |
| 2002/0116293 A1 | 8/2002 | Lao et al. |
| 2002/0124182 A1 | 9/2002 | Bacso et al. |
| 2002/0143612 A1 | 10/2002 | Barik et al. |
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1 | 11/2002 | Ishii et al. |
| 2002/0186844 A1 | 12/2002 | Levy et al. |
| 2002/0198843 A1 | 12/2002 | Wang et al. |
| 2003/0005173 A1 | 1/2003 | Shah et al. |
| 2003/0037242 A1 | 2/2003 | Yasuna et al. |
| 2003/0065717 A1 | 4/2003 | Saito et al. |
| 2003/0074465 A1 | 4/2003 | Tang et al. |
| 2003/0115144 A1 | 6/2003 | Stefik et al. |
| 2003/0120593 A1 | 6/2003 | Bansal et al. |
| 2003/0120928 A1 | 6/2003 | Cato et al. |
| 2003/0135424 A1 | 7/2003 | Davis et al. |
| 2003/0149742 A1 | 8/2003 | Bollerud |
| 2003/0182188 A1 | 9/2003 | Duchow |
| 2003/0192029 A1 | 10/2003 | Hughes |
| 2003/0225619 A1 | 12/2003 | Dokken et al. |
| 2003/0236886 A1 | 12/2003 | Oren et al. |
| 2004/0012618 A1 | 1/2004 | Finney et al. |
| 2004/0015427 A1 | 1/2004 | Camelio |
| 2004/0015445 A1 | 1/2004 | Heaven et al. |
| 2004/0034601 A1 | 2/2004 | Kreuzer |
| 2004/0039754 A1 | 2/2004 | Harple |
| 2004/0044949 A1 | 3/2004 | Rowe |
| 2004/0133605 A1 | 7/2004 | Chang et al. |
| 2004/0136698 A1 | 7/2004 | Mock |
| 2004/0143760 A1 | 7/2004 | Alkove et al. |
| 2004/0148229 A1 | 7/2004 | Maxwell |
| 2004/0148598 A1 | 7/2004 | Kita et al. |
| 2004/0153968 A1 | 8/2004 | Ching et al. |
| 2004/0167858 A1 | 8/2004 | Erickson |
| 2004/0172339 A1 | 9/2004 | Snelgrove et al. |
| 2004/0181459 A1 | 9/2004 | Wright |
| 2004/0203755 A1 | 10/2004 | Brunet |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0254883 A1 | 12/2004 | Kondrik et al. |
| 2004/0254949 A1 | 12/2004 | Amirthalingam |
| 2004/0267552 A1 | 12/2004 | Gilliam et al. |
| 2004/0267608 A1 | 12/2004 | Mansfield Jr. et al. |
| 2004/0268451 A1 | 12/2004 | Robbin et al. |
| 2005/0015765 A1 | 1/2005 | Covell et al. |
| 2005/0021478 A1 | 1/2005 | Gautier et al. |
| 2005/0034164 A1 | 2/2005 | Sano et al. |
| 2005/0038813 A1 | 2/2005 | Apparao et al. |
| 2005/0046705 A1 | 3/2005 | Smith |
| 2005/0050218 A1 | 3/2005 | Sheldon et al. |
| 2005/0050345 A1 | 3/2005 | Dowdy et al. |
| 2005/0080743 A1 | 4/2005 | Ostrover et al. |
| 2005/0080788 A1 | 4/2005 | Murata et al. |
| 2005/0132359 A1 | 6/2005 | McGuire |
| 2005/0144635 A1 | 6/2005 | Boortz |
| 2005/0165656 A1 | 7/2005 | Frederick et al. |
| 2005/0182792 A1 | 8/2005 | Israel et al. |
| 2005/0197946 A1 | 9/2005 | Williams et al. |
| 2005/0216472 A1 | 9/2005 | Leon et al. |
| 2005/0240529 A1 | 10/2005 | Thomas |
| 2005/0267894 A1 | 12/2005 | Carnahan |
| 2005/0278375 A1 | 12/2005 | Mitchko |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0041748 A1 | 2/2006 | Lockhart et al. |
| 2006/0048132 A1 | 3/2006 | Chen |
| 2006/0062426 A1 | 3/2006 | Levy et al. |
| 2006/0063590 A1 | 3/2006 | Abassi et al. |
| 2006/0074754 A1 | 4/2006 | Toyohara et al. |
| 2006/0107046 A1 | 5/2006 | Raley et al. |
| 2006/0112101 A1 | 5/2006 | Young |
| 2006/0143264 A1 | 6/2006 | Payne et al. |
| 2006/0161604 A1 | 7/2006 | Lobo |
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0218246 A1 | 9/2006 | Fawcett |
| 2006/0229929 A1 | 10/2006 | Hughes |
| 2006/0242640 A1 | 10/2006 | Pauly et al. |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |

(56) References Cited

U.S. PATENT DOCUMENTS

| | | |
|---|---|---|
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1 | 3/2007 | Borrett et al. |
| 2007/0073694 A1 | 3/2007 | Picault et al. |
| 2007/0083471 A1 | 4/2007 | Robbin et al. |
| 2007/0106522 A1 | 5/2007 | Collins et al. |
| 2007/0108274 A1 | 5/2007 | Boardman et al. |
| 2007/0192352 A1 | 8/2007 | Levy |
| 2007/0208670 A1 | 9/2007 | Quoc |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2008/0040379 A1 | 2/2008 | Suitts et al. |
| 2008/0071614 A1 | 3/2008 | Mebruer |
| 2008/0114860 A1* | 5/2008 | Keys et al. ............... 709/219 |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell et al. |
| 2008/0147530 A1 | 6/2008 | Kwan et al. |
| 2008/0147558 A1 | 6/2008 | Kraus |
| 2008/0155552 A1 | 6/2008 | Kim |
| 2008/0195651 A1 | 8/2008 | Rachmiel et al. |
| 2008/0214163 A1 | 9/2008 | Onyon et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmal et al. |
| 2009/0138117 A1 | 5/2009 | Bagwell et al. |
| 2009/0177989 A1 | 7/2009 | Ma et al. |
| 2009/0198830 A1 | 8/2009 | Zhang et al. |
| 2009/0240552 A1 | 9/2009 | Yang et al. |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally et al. |
| 2009/0307683 A1 | 12/2009 | Gharabally |
| 2010/0115443 A1 | 5/2010 | Richstein |
| 2010/0205274 A1 | 8/2010 | Gharabally et al. |
| 2010/0235254 A1 | 9/2010 | Mirrashidi et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0060776 A1 | 3/2011 | Suitts et al. |
| 2011/0189991 A1* | 8/2011 | Krause et al. ............ 455/432.1 |
| 2011/0228770 A1* | 9/2011 | Dholakia et al. ............ 370/390 |
| 2012/0016904 A1* | 1/2012 | Mahajan et al. ............ 707/769 |

FOREIGN PATENT DOCUMENTS

| | | |
|---|---|---|
| EP | 1 684 223 | 7/2006 |
| EP | 2 230 620 | 9/2010 |
| JP | H10-091407 | 4/1998 |
| JP | 2000-163269 | 6/2000 |
| JP | 2002-073192 | 3/2002 |
| JP | 2007-310690 | 11/2007 |
| WO | 97/04410 | 2/1997 |
| WO | 98/49644 | 11/1998 |
| WO | 00/08909 | 2/2000 |
| WO | 02/48920 | 6/2002 |
| WO | 2004/019182 | 3/2004 |
| WO | WO 2007/073522 | 6/2007 |

OTHER PUBLICATIONS

Jyri Huopaniemi, "Music Encoding and Transmission," CUIDAD meeting, ICMC 2000, Berlin, Aug. 28, 2000.

"Gracenote CDDB," Gracenote, product webpage, http://www.gracenote.com/gn_products/cddb.html, downloaded Oct. 7, 2003, pp. 1-2.

"Gracenote MusicID," Gracenotem product webpage, http://www.gracenote.com/gn_products/cddb.html, downloaded Oct. 7, 2003, pp. 1-2.

"Media Encoding FAQ," Loudeye Corp., http://loudeye.com/digitalmedia/solutions/mediaenchost/encodingfaq.asp, downloaded Oct. 9, 2003, pp. 1-3.

"Media Encoding," Loudeye Corp., http://www.loudeye.com/digitalmedia/solutions/mediaenchost/encoding,asp, downloaded Oct. 9, 2003, pp. 1-4.

"Media Hosting," Loudeye Corp., http://www.loudeye.com/digitalmedia/solutions/mediaenchost/hosting.asp, downloaded Oct. 9, 2003, pp. 12.

MPEG-7 Multimedia Description Schemes XM (Version 2.0). ISO/IEC, Mar. 2000, pp. 1-138.

"Music Collector Features," Collectorz.com music collector features, http://www.collectorz.com/music/features.php, downloaded Oct. 7, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

"Radified Guide to Ripping & Encoding CD Audio," http://mp3.radified.com, downloaded Oct. 7, 2003, pp. 1-5.

"Liquifier Pro 4.0 for Windows TM User's Guide," 1998, Liquid Audio, Inc., 1998, pp. 1-469.

Examiners Report from Canadian Application No. 2724858 dated Feb. 12, 2013.

Office Action from Chinese Application No. 2009/20121532.8 dated Sep. 26, 2013.

Final Office Action from Japanese Application No. 2011-512495 dated Apr. 26, 2013.

European Extended Search Report from EP Application No. 09773942.9 dated Nov. 21, 2013.

International Search Report and Written Opinion from PCT Application No. PCT/US2009/041737 dated Mar. 24, 2010.

"Is your computer OK? Latest Updating Techniques, XP, Me 98", Nikkei PC Beginners, Japan, Nikkei Business Publications, Inc., Jan. 13, 2006, vol. 11 No. 2, pp. 47-56 (non-translated).

* cited by examiner

AUTHENTICATION AND NOTIFICATION HEURISTICS

BACKGROUND

1. Technical Field

The present technology relates generally to network-based application distribution systems and more specifically to enhanced heuristics for scheduling updates and for batching notifications and authorization requests involving updates.

2. Introduction

Online commerce using is quickly becoming a ubiquitous part of the modern economy. Additionally, computing devices have become much more compact, mobile, and streamlined. Along with these advances, consumers have grown accustomed to media and software applications that are intelligently designed, easily accessible, and hassle-free to use. Likewise, consumers have come to expect that the online marketplace will be streamlined and user-friendly as well.

An example of an online marketplace is a network-based application distribution system. Such a market offers software application from software developers as free and paid downloads. Downloaded applications can also be updated by software developers from time to time to fix bugs, update settings, add additional content and features, etc. However, many known application updating and authorization protocols are non-intuitive, tedious, or otherwise not user-friendly. Indeed, system operators must balance practical requirements with the level of hassle-free design and user-friendliness that consumers expect.

For example, in an application distribution system, system operators must ensure that users are who they claim to be before making a purchase or updating an application; otherwise, a fraudulent user or a careless user (i.e. an infant mashing buttons) can make purchases, change settings, or otherwise wreak havoc to a user's account or device. Therefore, system administrators must put authorization checks in place; however, these requests for authorization should not be so frequent or burdensome so as to discourage use of an application distribution system.

Also, when operating an application distribution system, it is ideal that users apply software updates in a timely manner. For example, a quick application update with a patch to fix a minor problem can prevent the old software from crashing a device. Indeed, outdated applications on client devices having software bugs can impart very large maintenance costs to an application distribution system that supports those applications and their updates. Consequently, it is in the best interest of the administrators of the application distribution system that users of the applications update them as soon as updates and bug fixes become available to them. On the other hand, the same administrators do not want to pester their users fearing the negative consequences of overwhelming the user or seemingly monitoring user activity.

Likewise, while keeping the general preference for users to update applications when updates become available, it is in the best interest of the application distribution system to keep users' cellular carrier costs low so as not to discourage their use of the system.

Many users do not bother to check their device for available updates and must be prompted; however, the users are oftentimes prompted to initiate updates at times which may cause them to either incur massive cellular charges, wait a very long time over a slow connection, or shift their attention away from a dangerous or business-sensitive task, i.e. while driving or while drafting an important email. Additionally, once a user is prompted to download and install updates and the user accepts, it is oftentimes the case that many of the updates require a user to accept the terms of a notification, chose update features, and authorize the installation of the updates. When a large number of updates are being installed at one time, these notifications and requests for authorization can become tedious.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practice of the principles set forth herein.

The present technology provides systems, computer-readable media, devices and methods for server-based user authentication, scheduling when a user receives update notifications, and batching notifications together. These and other features of the present technology provide users with a less tedious application update experience by streamlining the process and delivering the update notifications and prompts at a time when the users can easily dispatch the updates.

Some embodiments of the present technology involve server-side authentication of user accounts by using multiple authentication tokens. Some embodiments of the present technology involve a server sending users updates for applications installed on their devices when those updates become available. Some other embodiments involve sending the user an update statement that an update is available for download. Some embodiments of the present technology involve batching and sending notifications or requests for authentications that are required for each application update that is currently ready for download.

Some embodiments of the present technology involve only prompting users that updates are available upon determining that a threshold amount of updates are available or by determining that a requisite amount of time has passed with an update pending. Some embodiments of the present technology involve prompting a user when the threshold is reached. Some embodiments involve waiting to prompt users that updates are available until the client device becomes connected to an adequately efficient network, or a network whose use does not result in financial obligations to the user.

In response to users accepting the terms of the batched notifications and adequately authenticating themselves, some embodiments of the present technology involve downloading updates only when network conditions meet system or user requirements. Some embodiments of the present technology involve only downloading updates upon a device being connected to a Wi-Fi network. Some embodiments of the present technology involve a tiered scheme of network checks that attempts to optimize update download efficiency.

Some embodiments of the present technology involve enforcing situational settings that avoid update prompts from interrupting user's current tasks or from distracting a user while performing certain tasks, i.e. driving. Some embodiments of the present technology involve a user profile and an interface for setting user preferences and situational settings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for a system for improving the efficiency and convenience of updating software onto a computing device by using improved notification, prompting and authorization heuristics.

Figure 1:
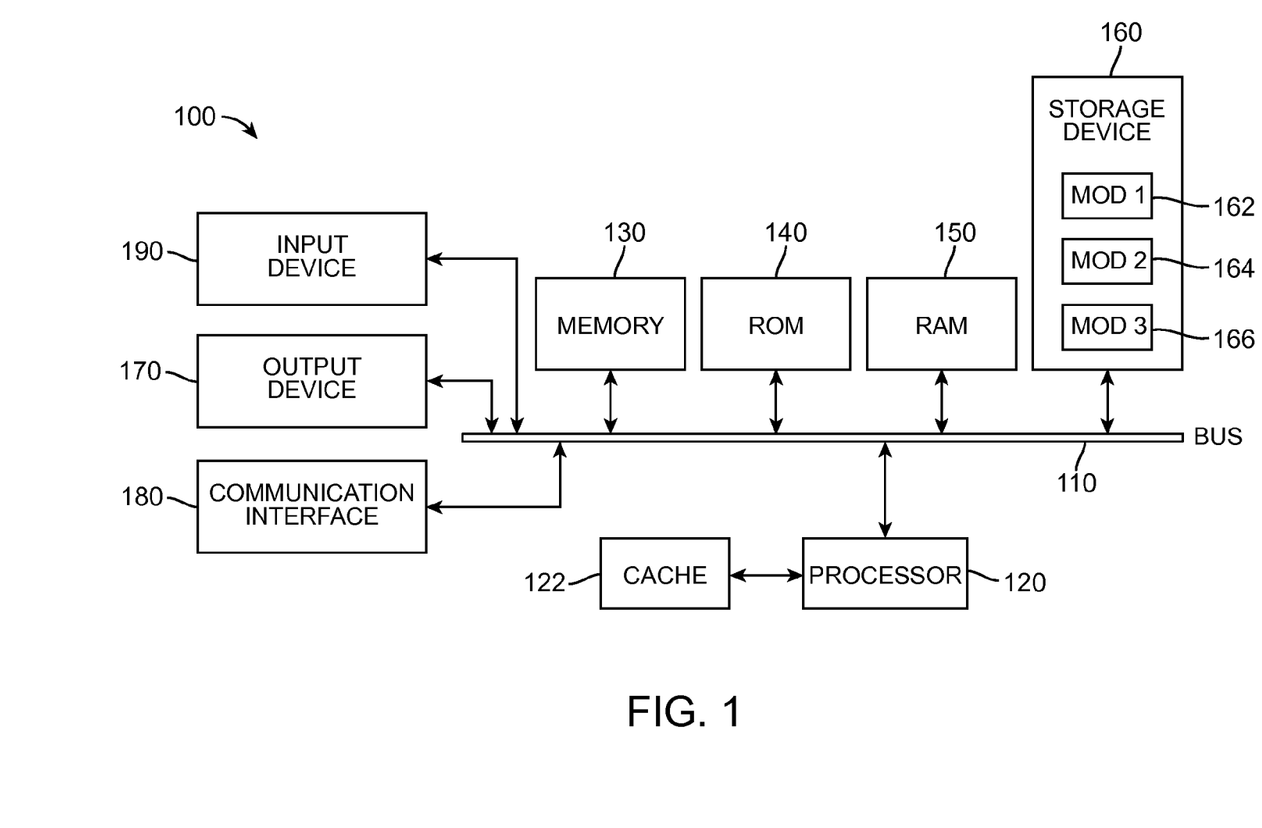
FIG. 1 is a front view of an electronic device in accordance with some embodiments of present technology.

A brief introductory description of a basic general purpose system or computing device, which can be employed to practice the concepts is illustrated in FIG. 1. A more detailed description of how the pre-installed software is associated with a user account will follow, including several variations as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of improving users' experiences with authenticating identity and receiving notifications and prompts for updating applications that are offered to a user account in an online application distribution store or market for installation on a computing device such as a personal computer, laptop, game console, smart phone, mobile phone, or tablet PC. The approaches set forth herein can improve the efficiency and convenience of updating software onto a computing device by using improved notification, prompting and authorization heuristics. First, a description of an exemplary application distribution system is given.

Figure 2:
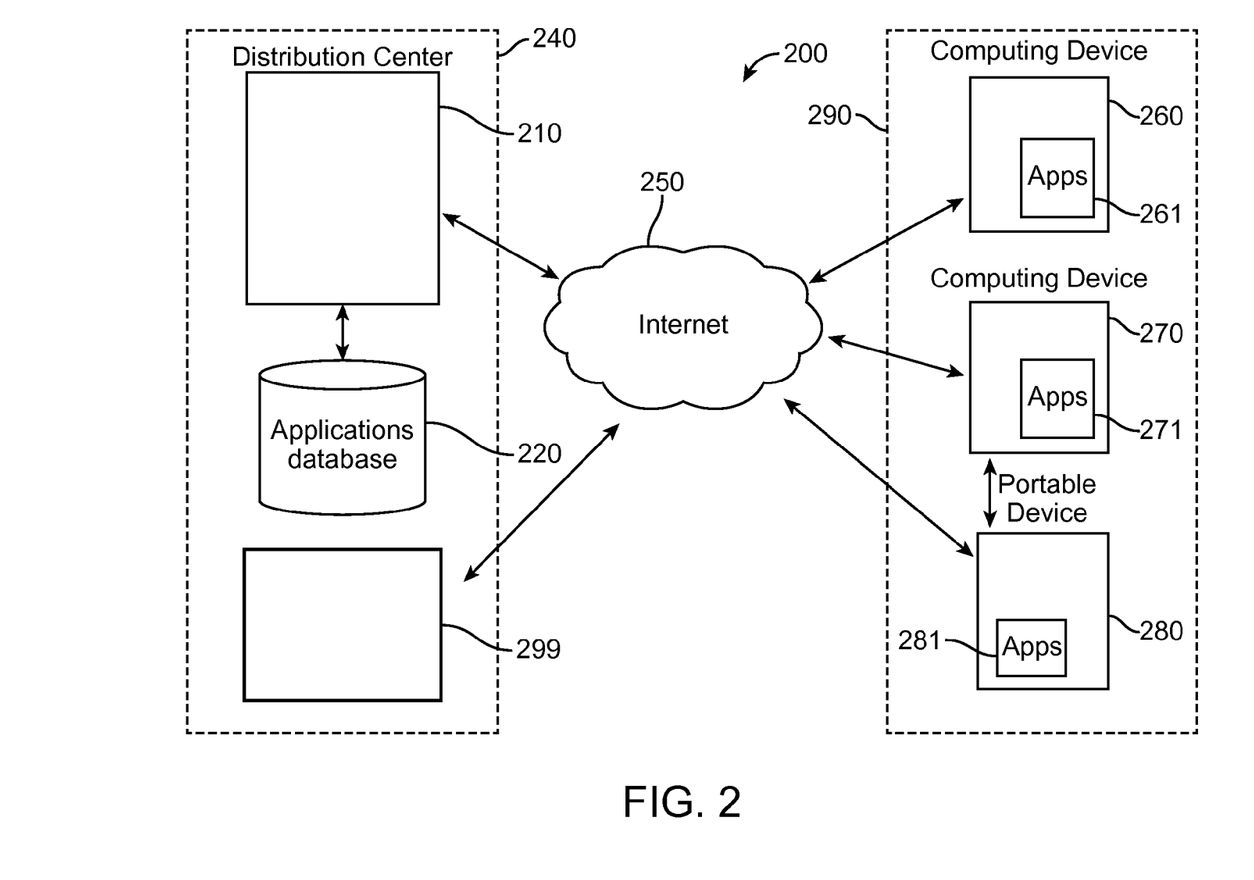
FIG. 2 illustrates an exemplary application distribution system according to some embodiments of present technology.

FIG. 2 illustrates an exemplary application distribution system. In this example, distribution system 200 includes distribution center 210, applications database 220, the Internet 250, and computing devices 260, 270, and 280. It will be appreciated that these devices can be any computing device known in the art, whether a desktop computer, laptop, smart phone, tablet, etc. Further, these devices may be portable or in a fixed location. Together, distribution center 210, applications database 220, and configurations server can represent server side 240 of a client-server model. Similarly, computing devices 260, 270, and 280 can represent client side 290 of the client-server model. It should be appreciated that references to a method being performed either server-side or client-side refers to devices on the server-side and client-side, respectively, that substantially perform these methods.

The broad overview of distribution system 200 includes server side 240 communicating with client side 290 via the Internet 250. As an example, the server side 240 can be represented to the user as an online store for the sale and distribution of applications. A device from client side 290 can communicate with the online store using an application management computer program stored on the device. In other examples, the Internet 250 can be replaced with other communication networks such as computer networks, telephone networks, Ethernet, local area networks, wired networks, wireless networks, and others.

Computing device 260 includes applications 261. Applications 261 can include applications that were purchased from distribution center 210 by a user of computing device 260. To purchase desired applications from distribution center 210, a user logs into user account. Logging into a user account can involve one or more requests for user authentication. Once logged in, the user may select a desired application to purchase. When the user agrees to pay the price of the application, the user's payment information is used to complete the transaction. Once the transaction is completed, the desired application is associated with user account, thus allowing the user to download the desired application and also updates of the desired application. Applications associated with user account can also be updated or re-downloaded onto other devices that are associated with user account. In this example, computing device 260, computing device 270, and computing device 280 are all associated with user account and thus, are configured to receive updates and re-downloads of all applications 281 that have been associated with user account. Moreover, computing device 280 can communicate with computing device 270 to transfer digital data and applications between the two devices. In one example, computing device 280 may be configured to be a central repository containing all applications 281 associated with user account that transfers selected applications to computing device 280. In this specification, the term "application" refers to a copy of a software program or application provided by a software provider. In other examples, other digital products besides software applications and software programs (such as system software, enterprise software, multimedia files, video files, audio files, and image files) on a computing device can also be associated with user account and distributed/re-distributed by distribution center 210.

Distribution center 210, which is coupled to applications database 220, is configured to sell, deliver, and maintain applications from applications database 220. Applications database 220 can be configured to store some or all of the applications available for distribution from server side 240. The applications can be sold, updated, and delivered, i.e. transmitted, to a device in client side 290 through the Internet 250. As such, distribution center 210 represents an online store for applications. For example, applications database 220 can receive a request from distribution center 210 for an application and in response to the request, transmits the requested application to distribution center 210, which subsequently transmits the application to the requesting device. The applications requested may be applications available for purchase or applications previously associated with a user account, i.e. previously purchased or pre-installed applications that have been adopted. In other examples, applications database 220 can directly transmit the requested application to the requesting device.

Users are sometimes prompted with request for authentication before gaining the ability to purchase new media items or applications, change account information, or update existing applications. Accordingly, some embodiments of the present technology involve improved heuristics for authenticating users.

Server-Based Authentication Enforcement

Some embodiments of the present technology involve a server-based approach for authenticating users. Referring again to FIG. 2, some embodiments of the present technology involve an authentication module 299 on the server-side 240 for authenticating users. Authentication on the server side of a distribution system 200 can be preferred in some cases. For example, in some embodiments of the present technology, server-side authentication is preferred over client-side authentication when the client device is a mobile device because a mobile device is open to increased security risks. Additionally, server-driven authorization is preferred due to its flexibility as the server's policies can be changed any time and modulated on a per country or per account basis. For example, server policy can be changed to adapt to emerging fraud patterns.

In some embodiments, when a user makes a purchase request from the distribution center 210, the authentication module 299 requires that the user enter identification information as well as a password. Upon the receipt of the appropriate authentication information, the distribution center 210 obtains access to the requested item from the applications database 220 and delivers the item to the user. Additionally, the authentication module 299 delivers one or more security tokens to the user, wherein the security tokens serve to provide authentication for future transactions with the distribution center 210.

In some embodiments of the present technology, the authentication module 299 can issue both a strong token to the user and a weak token to the user. In some embodiments of the present technology, a strong token allows a user to make sensitive changes, i.e. financial purchases with the distribution center 210 or changes to user billing information in a user account without the user needing to provide authentication details again. Also, the strong token has a short expiration period, i.e. fifteen minutes. Verification of the weak token allows the user to perform tasks without the user needing to provide authentication details again, but does not allow the user to make any additional requests that would expose the user to financial liability or that would alter his profile. The weak token can provide authorization to perform some interaction with the distribution system when the interaction only requires general, non-sensitive data. For example, in some embodiments of the present technology, a weak token can provide authorization to update an application—assuming the update is free and does not otherwise involve sensitive information or additional user prerequisites, i.e. age requirement. In some embodiments, the weak token can have a longer expiration period, i.e. six months; can be used for any non-financial action with the distribution center 210; and can be renewed upon each new, strong token-authenticated financial transaction. Accordingly, in these embodiments, the authentication module 299 requests validation of either the strong token or weak token from the client side 290 depending on the type of transaction that is subsequently requested. Likewise, in some embodiments, an administrator can change the types of events that require a strong or weak token.

Figure 3:
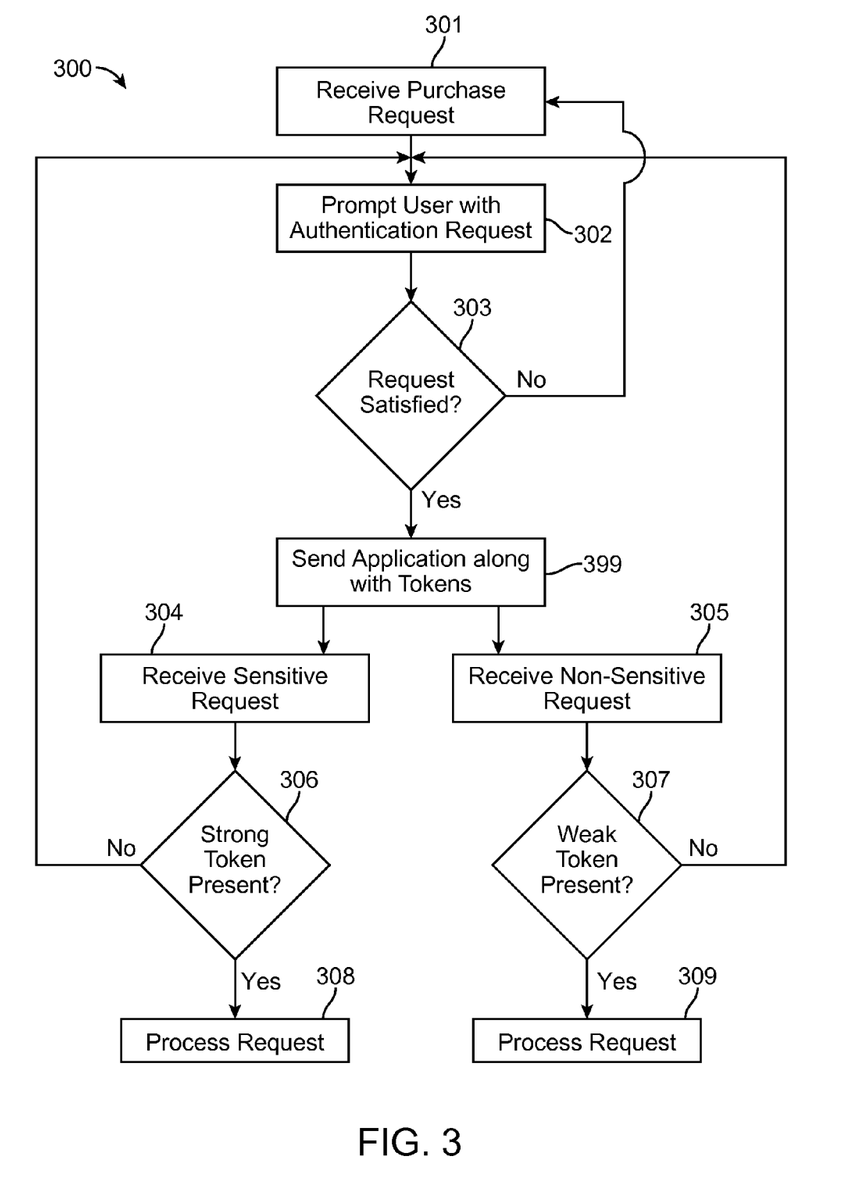
FIG. 3 illustrates an exemplary method of server-side processing of client requests in an application distribution system according to some embodiments of the present technology.

FIG. 3 illustrates an exemplary method 300 of server-based processing of client requests in an application distribution system according to some embodiments of the present technology. The method 300 of FIG. 3 begins with receiving a purchase request 301, or a free download request, from a user's computing device. A purchase request 301 results in a prompt from the server-side, prompting the user with a request to enter authentication information 302. A decision block 303 decides if the authentication information is correctly entered and if so, sending 399 the user the requested application along with two security tokens: a weak token and a strong token. In some embodiments, if the authentication information is entered incorrectly, the method 300 begins over as though a request is being made again.

Next, a request is made by the user through their computing device that involves sensitive information 304, such as financial information or private user data. In the method 300 of FIG. 3, the server-side processes the request 308 only if the strong token has not expired 306. Otherwise, the user must re-authenticate. Similarly, a request is made on a user's computing device that involves general information 305, such as merely confirming an update. In the method 300 of FIG. 3, the server-side processes this request 307 if the weak token has not expired 309. Otherwise, the user must re-authenticate.

According to the method 300 of FIG. 3, the server in the application distribution system can enforce purchase requests, update authentications, etc.

Additionally, a number of heuristics are available for making the purchase and update of applications more user-friendly while maintaining a threshold level of security. For example, in some embodiments of the present technology, the authentication module 299 can relax authentication requirements for those users who utilize a self-imposed passcode for deterring unauthorized use of a device. In some aspects of this embodiment, the computing device or server-side device can be programmed by default to utilize relaxed authentication requirements for users that have a passcode needed before operating the device. In one example, the computing device might not prompt a user for a password before making a purchase, or update of an application or editing a user account. In some aspects, a user can proactively change security settings in a computing device to indicate that he is satisfied with a passkey entry replacing the more secure authentication verifications to result in relaxed authentication requirements.

In some embodiments of the present technology, a mobile device equipped with geo-location capabilities can inform the authentication module 299 that the user is located in a safe environment, i.e. the user's home. Likewise, a client device can sense that a user is at home by detecting a home Wi-Fi address. In these examples, the client device can inform the authentication module 299 that the user is willing to relax authentication requirements while in that, relatively, secure location.

Notification Scheduling

As explained above, applications on a client device having software bugs can impart very large maintenance costs to an application distribution system that supports those applications and their updates. Consequently, it is in the best interest of the administrators of the application distribution system that users of the applications update them as soon as bug fixes become available to them. On the other hand, the same administrators do not want to pester their users fearing the negative consequences of seeming like Big Brother. Accordingly, the present technology provides solutions for informing users that updates and new content is available for their applications in a way that is not intrusive, that will not waste resources, and that will not require a user to interact with a device when they are busy with other important tasks or while performing actions that require the users' steadfast attention.

According to some embodiments of the present technology and referring again to FIG. 2, whenever a user on the client side 290 interacts with the distribution center 210, the distribution center 210 sends back parameters that determine an expiration date to the client device, i.e. the computing device 280. When the duration of the object expires, the client device automatically sends a request to the distribution center 210 requesting a status relating to whether one or more applications installed on the client device have available updates. In some other embodiments of the present technology, each time an application from the applications database 220 receives an update, the distribution center 210 pushes a notification to the client device on the client side. In any event, as explained above, many users do not bother to check their device for available updates. Accordingly, some embodiments of the present technology involve heuristics for prompting a user that updates are available and for executing the updates to completion.

Figure 4:
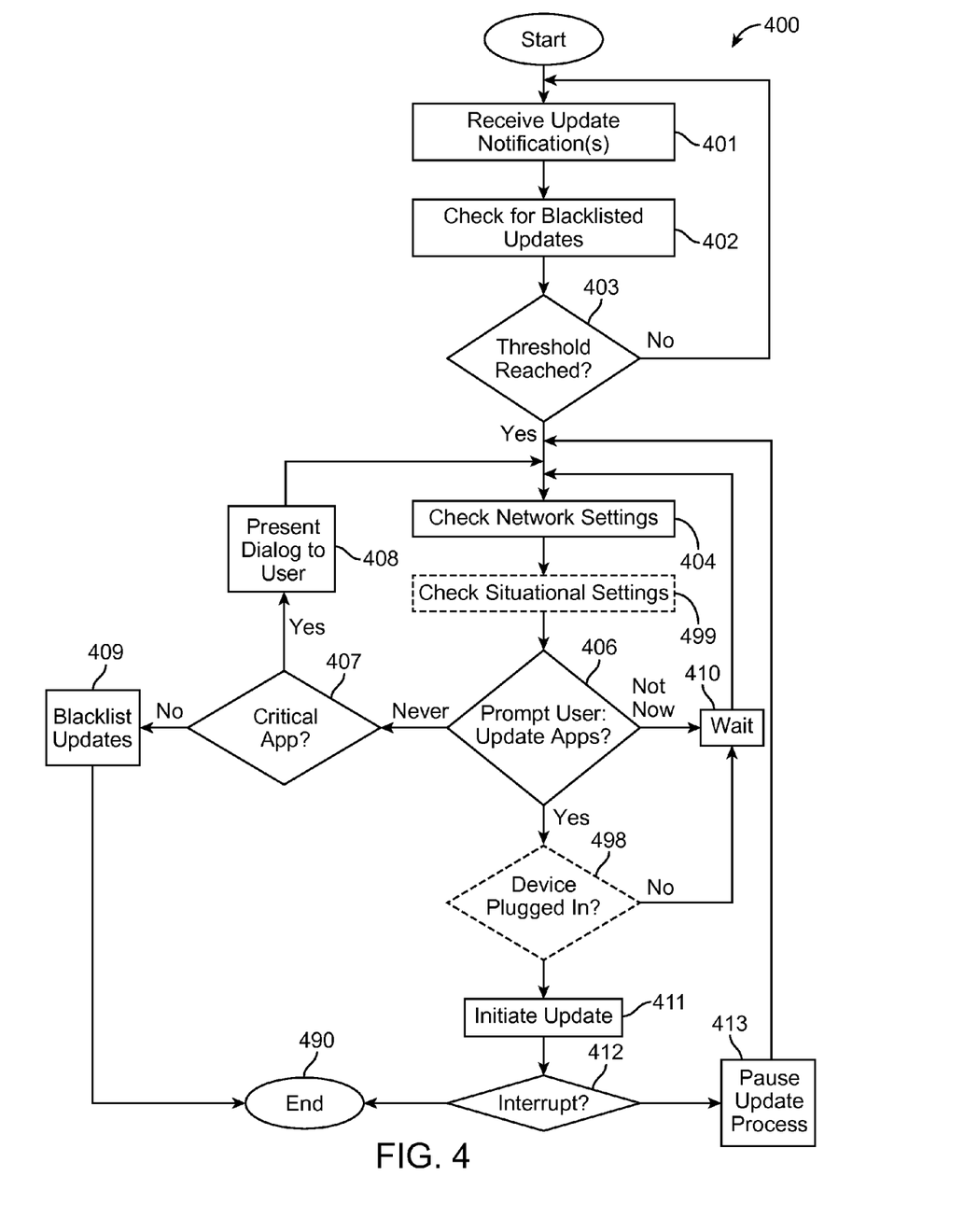
FIG. 4 illustrates an exemplary method of determining how and when to prompt a user that application updates are pending and how to carry out the update process according to some embodiments of the present technology.

FIG. 4 illustrates an exemplary method 400 of determining how and when to prompt a user that application updates are pending and how to carry out the update process according to some embodiments of the present technology.

The method 400 shown in FIG. 4 begins with a client device receiving one or more update statements 401 from the server-side noting that an update is available on the server-side of an application distribution system. In some embodiments, a user is not notified of a newly received statement, but can proactively seek out a statement by querying the application distribution system as to whether a statement has been received for any applications on the client's computing device.

The client device receives update statements by pulling from an application distribution system, an application distribution system pushing the statements to the client device, or in a hybrid push-pull scenario. In some embodiments of the present technology, an icon receives a badge when an update statement is available. One example of this badge can be found on various mobile and tablet devices made by Apple Inc. For example, an iPhone™ having substantially square icons representing applications can include a small circular badge place in one corner. One example of this badge of this type being used for a different purpose can be seen on the phone application wherein a small badge lists a number that corresponds to a number of notifications from that application to a user. Also, the badge can take the shape of a sash that spans across the corner of an application icon and can have text located therein to convey the status of the update.

In some embodiments, the badge can be displayed over each application that has an update available. In some embodiments, a cumulative badge can be displayed over an application specific for managing app updates such as the App Store App$^{SM}$ on Apple Inc's iPhone®.

When a new update statement is received, the method 400 checks to see whether the update has been blacklisted 402. Various reasons might cause an update to be blacklisted that will be apparent to those with ordinary skill in the art having the benefit of this disclosure; however, in some embodiments, as explained below, an update is blacklisted if a user proactively tells the device never to apply the update, or to not apply an update for this version, or for a period of time.

As explained above, a developer of an application distribution system does not want to pester the clients of the application distribution system. Accordingly, in some embodiments of the present technology, the application distribution system only prompts clients when a certain threshold of applications available for update is reached. In some embodiments, prompts from the application distribution system comprise a dialog box or other menu that requires a user's reply before proceeding. Therefore, the method 400 continues by checking whether or not a threshold of update statements has been reached 403.

In some embodiments of the present technology, the threshold is reached when requisite number of updates is available. In some other embodiments, the threshold is reached when a requisite percentage of the total number of applications currently installed on the computing device has an update available. In some other embodiments, the threshold is reached when a requisite amount of time has passed, i.e. a certain number of days, from when the update notification was received. In some embodiments, the threshold is reached when a combination of these circumstances is present. For example, in some embodiments, a user is notified when at least five update notifications have been available for over thirty days. Although specific example embodiments are disclosed herein, it will be readily apparent to those with ordinary skill in the art having the benefit of this disclosure that any update percentages, amounts, number of days, etc. can be used as thresholds, as well as various other metrics.

Additionally, as explained above, the application distribution system has an interest in keeping the cellular carrier costs associated with data usage by the client devices to a minimum to prevent users avoiding updates due to incurred costs. Accordingly, some embodiments of the present technology involve making a decision of whether or not to prompt a user about updates depending on whether the client device is presently connected to a Wi-Fi network. Similarly, the application distribution system has an interest in keeping update download time short to prevent users from skipping updates so they can enjoy other device features without having to wait. Consequently, some embodiments of the present technology involve making a decision whether or not to prompt a user about the presence of updates depending on network speed—whether it is Wi-Fi vs. cellular or X-generation cellular vs. Y-generation cellular. Accordingly, if a threshold has been reached in step 402, the method 400 continues with checking network conditions and network preference settings 404.

Figure 5:
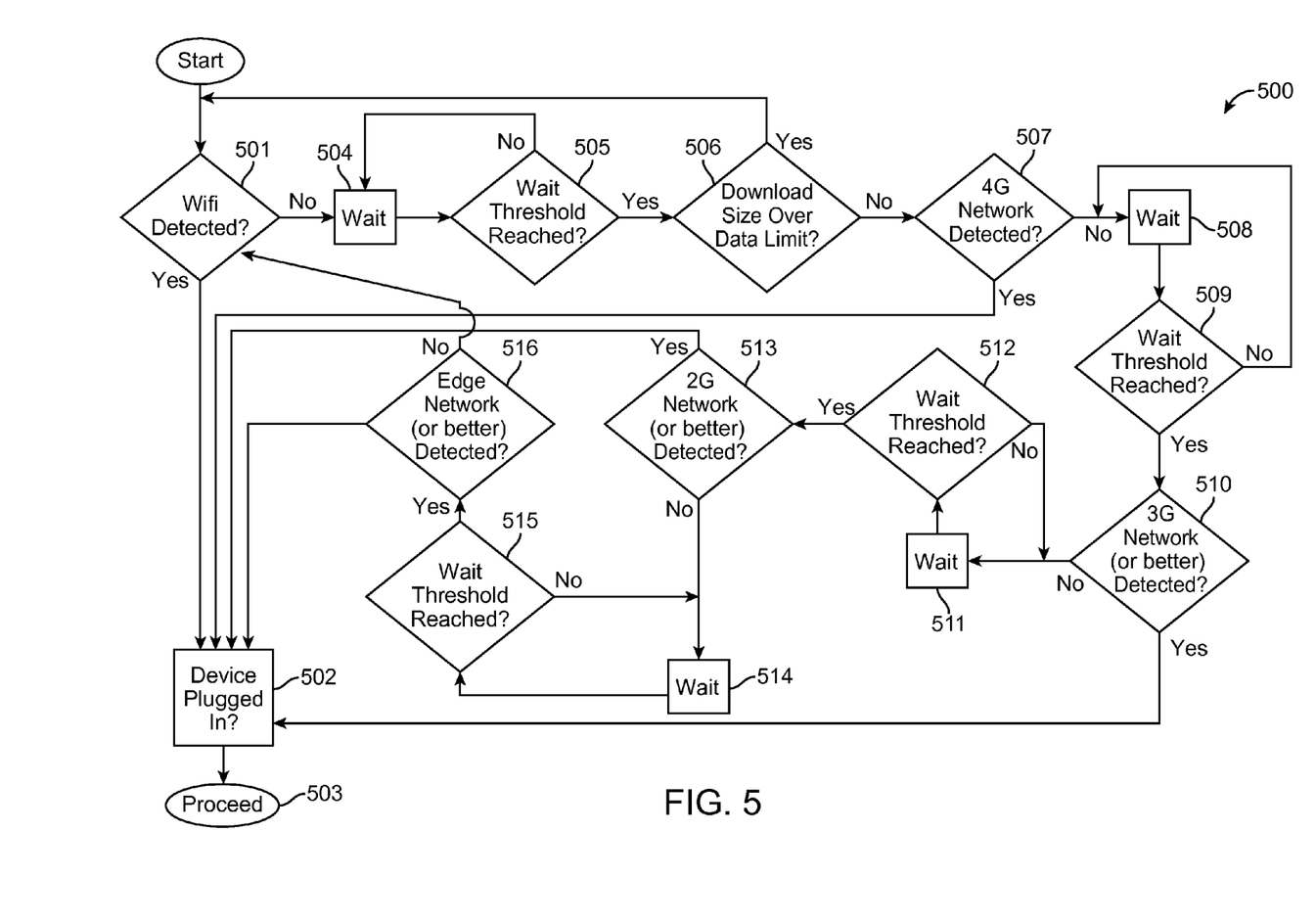
FIG. 5 illustrates a specific method for checking network conditions and enforcing network preferences according to some embodiments of the present technology.

It will be apparent to those with ordinary skill in the art having the benefit of this disclosure that a wide variety of methods exist for checking network conditions and enforcing network preferences. FIG. 5 illustrates a specific method 500 for checking network conditions and enforcing network preferences according to some embodiments of the present technology. The method 500 involves a tiered system of network checks that attempts to optimize update download efficiency. Indeed, the settings and preferences relating to the network checks can be programmed by a system administrator, a user, or combinations thereof. In some embodiments of the present technology, the server learns of the network state by querying the client's computing device.

First, before downloading and installing application updates on a client device, the system determines whether the client device is currently connected to a Wi-Fi network 501. If so, the system optionally checks if the device is currently connected to a power source 502. For example, some updates and system backup procedures can be very lengthy and can be disrupted if not allowed to completely finish. Accordingly, in some embodiments, the client device may need to be plugged in to ensure that the battery life is not depleted during an update or backup. In some other embodiments, a user can indicate that downloads only occur when the client's computing device is deemed idle for a requisite time. In some embodiments, system settings are configured such that a device will consider itself idle under certain conditions, i.e. when the device is plugged in at nighttime and is not interacted with for over one hour. The method 500 then proceeds 503 to initiate the update.

Again, the system determines whether the client device is currently connected to a Wi-Fi network 501. If the client device is not connected to Wi-Fi, the method waits 504 and iteratively checks whether a threshold period of time has passed 505. Upon reaching a threshold period of time, the system determines whether the download size of an update (or other network activity) would involve requiring a client device to expend cellular network time that would bring the user's plan over a carrier-imposed data limit 506. Indeed, exceeding data limits would result in financial liability and, most likely, reduced performance. In some embodiments of the present technology, if the download system settings require that a data limit is not exceeded, the method 500 then waits until Wi-Fi is detected before initiating a download.

In some embodiments of the present technology, updates can be determined to be important by a server administrator or if the metadata associated with the update indicates it is important for security reasons. In these embodiments, the server can push the update through, despite the client's computing device not being connected to Wi-Fi, based on an administrator assuming that users would rather expend some data airtime in order to install an important update. Likewise, the heuristic that determines when to forego the Wi-Fi requirement can allow for dynamic time and context thresholds based on another factor such as how many applications have updates pending.

If a data limit will not be exceeded (or if system settings permit exceeded limits), the system determines whether a first network type, i.e. a $4^{th}$ Generation Cellular network, is detected 507. If so, the method 500 proceeds to optional step 502 and goes forward with the update process. If not, the method 500 performs a process of successive network checks 510, 513, 516; waiting periods 508, 511, 514; and waiting period threshold checks 509, 512, 515 until a network is detected that can perform the update process consistent with the system settings.

Referring again to FIG. 4, the method 400 also optionally determines whether or not one or more situational conditions are present which conflict with a user's situational settings 499. In some embodiments, situational settings can include not prompting a user to update one or more applications while driving. In some embodiments, the client's computing device infers that a user is driving by triangulating position information supplied by a geo-location module or GPS device. In some embodiments of the present technology, a client device infers that a user is driving if it rapidly detects a series of Wi-Fi networks. In some embodiments of the present technology, a client device infers that a user is driving if it is connected to a car Bluetooth™ speaker or plugged in to a car kit with an recognized connector type. In some embodiments, situational settings can include not prompting a user to update one or more applications while composing an email. In some embodiments, situational settings can include not prompting a user to update one or more applications while playing a game. If a user has not imposed situational settings or if a prohibited situation does not occur, the method 400 continues with prompting a user 405 to update his applications.

In some embodiments of the present technology, prompting a user 406 involves presenting a dialog box with three options for responding to the question of whether to update the applications now: "Yes," "Not Now," or "Never."

If a user responds to the dialog box with "Never," the method 400 checks 407 whether or not one or more of the updates are critical. An example of a critical update is an update to the operating system or an essential security patch. If an update is critical, the method 400 continues with presenting 408 the user with another dialog box informing the user why the update cannot be ignored. If the updates are not critical, the updates are blacklisted 409 and the method ends 490.

If, in response to the method 400 prompting a user 406, the user responds with "Wait," the method 400 waits 410 a certain amount of time before re-checking network conditions, situational setting, and re-prompting the user. Finally, if the user responds with "Yes," the method 400 proceeds. Optionally, the method 400 involves determining whether a device is plugged in 498 before proceeding with an update.

Once the update is initiated 411, the method 400 monitors the update progress and determines if the update experiences an interruption 412. If the update does not, the update finishes and the method 400 ends. If the update experiences an interruption, the update process is paused 413 and network conditions are re-checked, situational setting are re-checked, and the user is again prompted.

FIG. 4 illustrates an exemplary method 400 for the purpose of illustration only. In some other embodiments, methods automatically download and install all free updates and only perform a process of notification scheduling for paid updates.

In some embodiments of the present technology, a user pre-pays for a series of updates and the updates are then automatically downloaded and installed. According to these embodiments, new episodes that become available for subscriptions to periodicals, i.e. magazines, newspapers, podcasts, etc, will not cause a user prompt.

In some embodiments, the various threshold, network, and situational concerns vary depending on how often a user uses a particular application or how often an entire user base uses a particular application. In some embodiments of the present technology, a user sets preferences on a first device and then all devices tied to that user's account enforces those settings. Likewise, if multiple accounts use a single device, the device can enforce multiple settings. In some other embodiments, a different set of preferences are required for a system backup than those required for an application update. Those with ordinary skill in the art having the benefit of this disclosure will readily appreciate that many other methods are contemplated for scheduling notifications and carrying out update downloads and installations.

Also as explained above, once a user is prompted to download and install updates and the user accepts it is oftentimes the case that many of the updates require a user to accept the terms of a notification, chose update features, and authorize the installation of the updates. When a large number of updates are being installed at one time, these notifications and requests for authorization can become tedious. Accordingly, some embodiments of the present technology involve batching notifications and requests for authorization, and avoiding duplicates thereof.

Batching Notification and Authorization Requests

As discussed above, it is in the best interest of the application distribution system to avoid annoying its users with tedious request for feedback. Additionally, the present technology avoids a first download ending without a user noticing and a subsequent download sitting idle while the system waits for a user's acquiescence to a notification.

Consequently, some embodiments of the present technology involve batching notifications relating to application updates and requests for authorizations to download and install application updates. Examples of notifications and requests for authorization include notifications relating to an application using a lot of data, requests for a user to verify that he is above a certain age, requests for a system password, requests for an application password, requests for verification that an application will not be used while driving, etc.

Figure 6:
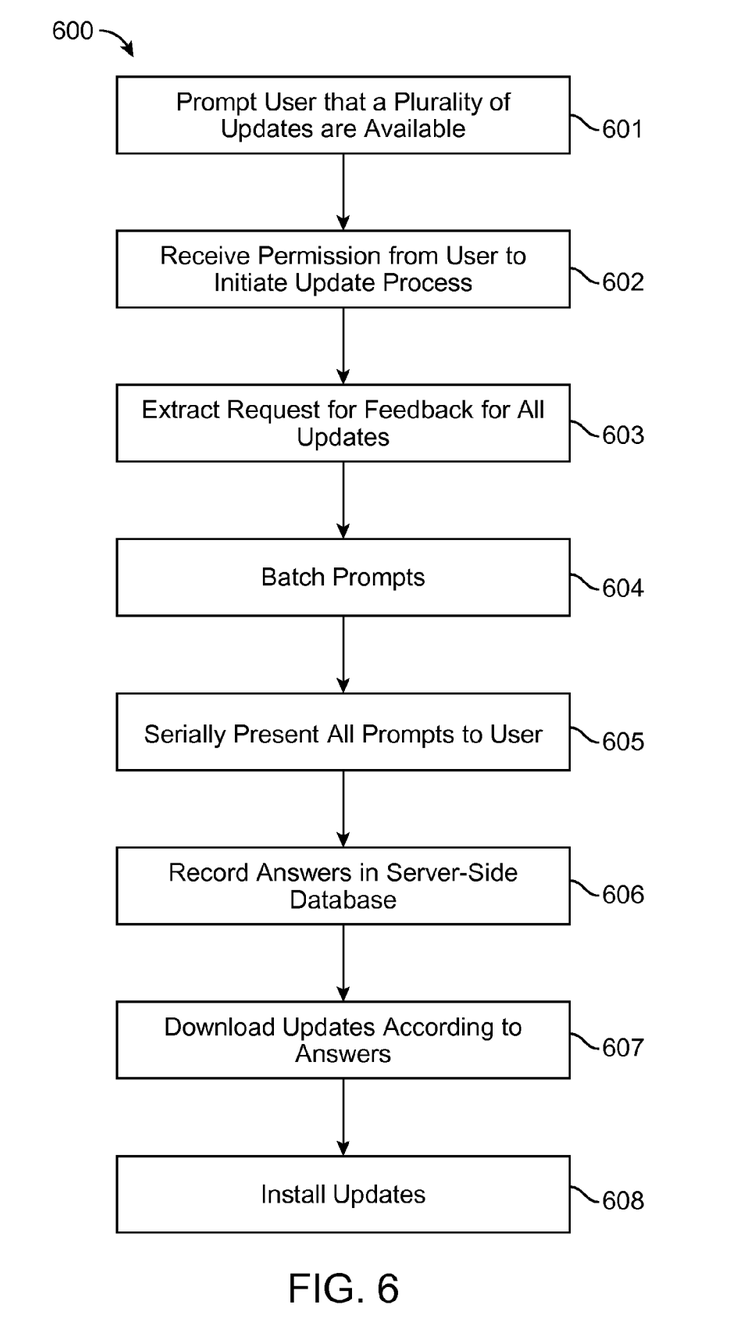
FIG. 6 illustrates an exemplary method for batching notifications relating to application updates and requests for authorizations to download and install application updates according to some embodiments of the present technology.

FIG. 6 illustrates an exemplary method 600 for batching notifications relating to application updates and requests for authorizations to download and install application updates according to some embodiments of the present technology. First, as explained above, some embodiments of the present technology involve prompting a user when a plurality of updates are available 601. Upon receiving permission from the user to initiate the update process 602, the server locates all of the uploads from an application database and extracts all of the dialog prompts, notifications, authorization requests, password requests, etc. from the group of updates 603. Next, the system batches the prompts together 604 serially and avoids duplicative requests. Duplicative requests can be fairly common. For example, an application distribution system might require that some applications obtain positive affirmation from the user that the user is of an age of majority, i.e. 17+. If the plurality of updates contains multiple updates for application requiring a user to be of an age of majority, the method truncates duplicative dialog boxes, thereby saving the user time and annoyance.

Next, the batch of requests for user feedback is serially presented to the user 605 and the user responds in turn. In some embodiments, the answers to the requests for feedback are recorded on a server-side of an application distribution system 606 and the download process proceeds 607 according to the user's answers. Finally, the updates are installed 608.

This method 600 avoids a fragmented update process as follows: Suppose the requests for feedback are presented periodically after each individual application update finishes, rather than serially before a group of updates begin. If a user is distracted from the update process after the first individual application update finishes, he might return to find that the entire process has been stalled while the system waits for him to answer a request for feedback. On the other hand, since the method 600 asks for all user input serially in the beginning of the process 605, the system does not wait for additional feedback and the update process can complete without further user interaction being required.

Some other embodiments of the present technology involve, batching notifications relating to application updates and requests for authorizations to download and install application updates across multiple devices and across multiple accounts.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer-implemented method comprising:
sending, by a server, to a client device, an update statement indicating that an update is newly available for one or more applications on the client device;
determining, by the server, whether a threshold amount of update statements have been received on the client device;
upon determining, by the server, that a threshold amount of update statements have been received on the client device, checking whether a user's network preferences are presently supported in the client-side environment; and
upon determining that the user's network preferences are presently supported in the client-side environment, sending an instruction to the client device that causes the client device to prompt the user with a dialog box that a batch of updates are available for download and installation, wherein the dialog box requires a response by the user.

2. The method of claim 1, wherein determining whether a threshold amount of update statements have been received on the client device comprises the server determining whether a requisite number of update statements have been present on the client device for a requisite amount of time.

3. The method of claim 1, wherein checking whether a user's network preferences are presently supported in the client-side environment comprises the server determining whether the user's client device is currently connected to a Wi-Fi network.

4. The method of claim 3, wherein, upon determining that a user's client device is not currently connected to a Wi-Fi network, waiting a predefined amount of time for the client device to connect to a Wi-Fi network.

5. The method of claim 4, wherein, upon the expiration of the predefined amount of time, causing the client device to utilize a cellular data network for the downloading a batch of updates.

6. The method of claim 3, further comprising:
upon determining that a user's client device is not currently connected to a Wi-Fi network, determining, by the server, that at least one update in the batch of updates is important; and
send an instruction to the client device that causes the client device to download the update deemed important despite the update causing the user's client device to expend cellular data bandwidth.

7. The method of claim 1, further comprising:
accessing, from the client device, a set of situation preferences defining situations in which interacting with a client device or being interrupted by a prompt is prohibited or unwanted, and
upon determining that the user's situational preferences are presently supported in the client-side environment, send an instruction to the client device that causes the client device to prompt a user that a batch of updates are available for download and installation.

8. The method of claim 1, further comprising:
determining that the client device is in an idle state; and
sending an instruction to the client device that causes the client device to download the batch of updates.

9. The method of claim 8, wherein determining that the client device is in an idle state includes receiving an idle notification from the client device, the idle notification indicating that the device has been plugged in for a determined period of time.

10. The method of claim 1, further comprising:
receiving an indication from the client device that a user has chosen to forego a batch of updates, placing the foregone updates on a blacklist of updates, and
ignoring the blacklisted update statements during a subsequent determinations of whether a threshold amount of new update statements have been received on the client device.

11. The method of claim 10, further comprising:
determining, by the server, that an update in the batch of updates is critical; and
downloading the update deemed critical despite the indication to forego the update.

12. A network-based application distribution system comprising:
a processor; and
a memory configured to store one or more sequences of instructions which, when executed by the processor, cause the processor to perform a processes comprising:
sending update statements to a client device when an application installed on the client device has an update added to the applications database;

determining whether a threshold amount of update statements have been received on the client device;

upon determining that a threshold amount of update statements have been received on the client device, checking whether a user's network preferences are presently supported in the client device's environment; and upon determining that the user's network preferences are presently supported in the client-side environment, sending an instruction to the client device that causes the client device to prompt the user with a dialog box that a batch of updates are available for download and installation, wherein the dialog box requires a response by the user.

13. The system of claim 12, wherein the one or more sequences of instructions, when executed by the processor, further cause the processor to determine a state of a client device with respect to variables pertinent to updating applications on the client device.

14. The system of claim 13, wherein the one or more sequences of instructions, when executed by the processor, further cause the processor to determine the variable of network connection type comprises at least one of Wi-Fi and cellular.

15. The system of claim 14, wherein the one or more sequences of instructions, when executed by the processor, further cause the processor to determine that at least one update in the batch of updates is sufficiently important, and cause the client device to download the update deemed sufficiently important.

16. The system of claim 12, wherein the one or more sequences of instructions, when executed by the processor, further cause the processor to determine that a user has configured a password protection scheme to prevent unauthorized operation of the client device receive a report from the client device indicating a successful receipt of a password that satisfies the password protection scheme, and accept the report in substitution for a request for user feedback.

17. The system of claim 16, wherein the one or more sequences of instructions, when executed by the processor, further cause the processor to detect that the client device is connected to a network known to be a home network and accept the detection of the connection to the home network in substitution for a request for user feedback.

18. A non-transitory computer-readable medium including one or more sequences of instructions which, when executed by one or more processors, causes the processors to perform a method, comprising:

sending, by a server, to a client device, an update statement indicating that an update is newly available for one or more applications on the client device;

determining, by the server, whether a threshold amount of update statements have been received on the client device;

upon determining, by the server, that a threshold amount of update statements have been received on the client device, checking whether a user's network preferences are presently supported in the client-side environment; and upon determining that the user's network preferences are presently supported in the client-side environment, sending an instruction to the client device that causes the client device to prompt the user with a dialog box that a batch of updates are available for download and installation, wherein the dialog box requires a response by the user.

19. The non-transitory computer-readable medium of claim 18, wherein the one or more sequences of instructions, when executed by the one or more processors, further cause the processors to determine a state of a client device with respect to variables pertinent to updating applications on the client device.

20. The non-transitory computer-readable medium of claim 18, wherein the one or more sequences of instructions, when executed by the one or more processors, further cause the processors to determine that the variable of network connection type comprises at least one of Wi-Fi and cellular.

21. The non-transitory computer-readable medium of claim 18, wherein the one or more sequences of instructions, when executed by the one or more processors, further cause the processors to determine that at least one update in the batch of updates is sufficiently important, and causing the client device to download the update deemed sufficiently important.

22. The non-transitory computer-readable medium of claim 18, wherein the one or more sequences of instructions, when executed by the one or more processors, further cause the processors to determine that a user has configured a password protection scheme to prevent unauthorized operation of the client device, receive a report from the client device indicating a successful receipt of a password that satisfies the password protection scheme, and accept the report in substitution for a request for user feedback.

23. The non-transitory computer-readable medium of claim 18, wherein the one or more sequences of instructions, when executed by the one or more processors, further cause the processors to detect that the client device is connected to a network known to be a home network and accept the detection of the connection to the home network in substitution for a request for user feedback.

* * * * *